US012753051B2

(12) United States Patent
Hoyt

(10) Patent No.: US 12,753,051 B2
(45) Date of Patent: Oct. 6, 2026

(54) SYSTEM AND METHOD FOR DETERMINING POSITION OF A PIPELAYER BOOM

(71) Applicant: Caterpillar Inc., Peoria, IL (US)

(72) Inventor: Daniel Wilson Hoyt, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 21 days.

(21) Appl. No.: 18/816,262

(22) Filed: Aug. 27, 2024

(65) Prior Publication Data

US 2026/0062259 A1 Mar. 5, 2026

(51) Int. Cl.
*B66C 13/46* (2006.01)
*B66C 23/44* (2006.01)
*F16L 1/028* (2006.01)

(52) U.S. Cl.
CPC .............. *B66C 13/46* (2013.01); *B66C 23/44* (2013.01); *F16L 1/028* (2013.01)

(58) Field of Classification Search
CPC ........... B66C 13/46; B66C 23/44; F16L 1/028
See application file for complete search history.

(56) References Cited

U.S. PATENT DOCUMENTS 4,480,942 A * 11/1984 Farrow ................... F16L 1/036 405/184.5
6,755,604 B1 * 6/2004 Schaeff ................... E02F 3/308 414/706
9,085,869 B2 7/2015 Faivre
2001/0046433 A1 * 11/2001 Nishimura .............. E02F 3/964 414/694
2003/0015488 A1 * 1/2003 Forsyth ................. E02F 3/7609 212/258
2014/0119870 A1 5/2014 Martinez et al.
2016/0169413 A1 * 6/2016 Camacho .................. F16L 1/06 414/745.6
2016/0230371 A1 8/2016 Musheno
2022/0186461 A1 * 6/2022 Konda .................... E02F 9/205
2023/0316711 A1 * 10/2023 Unuma ................... E02F 9/264 382/224

(Continued)

FOREIGN PATENT DOCUMENTS

CA 3052060 C * 3/2022 ................ E02F 3/96
CN 113047353 B 9/2022

(Continued)

OTHER PUBLICATIONS

English Translation of KR20230044253 (Year: 2023).*

(Continued)

*Primary Examiner* — Jong-Suk (James) Lee

(57) ABSTRACT

A system for determining an angular position of a boom of a pipelayer is disclosed. The system includes a linkage, an angle sensor, and a controller. The linkage includes a first arm configured to be coupled to a frame of the pipelayer, a second arm configured to be coupled to the boom, and a pivot joint pivotally connecting the first arm to the second arm. The angle sensor is positioned at the pivot joint. The angle sensor is configured to detect a pivot angle between the first arm and the second arm. The controller is configured to determine, based on the pivot angle, the angular position of the boom relative to the frame of the pipelayer.

20 Claims, 4 Drawing Sheets

(56) References Cited

U.S. PATENT DOCUMENTS

| | | | | |
|---|---|---|---|---|
| 2024/0287765 | A1* | 8/2024 | Ishii | E02F 3/43 |
| 2025/0155266 | A1* | 5/2025 | Yoshizumi | G01D 5/12 |

FOREIGN PATENT DOCUMENTS

| | | | | | |
|---|---|---|---|---|---|
| CN | 113874315 | B | * | 1/2024 | B66F 11/042 |
| CN | 120517481 | A | * | 8/2025 | B62D 7/20 |
| DE | 102020125626 | A1 | | 4/2021 | |
| JP | 3178556 | B2 | * | 6/2001 | |
| JP | 2001159518 | A | * | 6/2001 | |
| JP | 2003119818 | A | * | 4/2003 | E02F 9/264 |
| JP | 2003119832 | A | * | 4/2003 | |
| JP | 2012032199 | A | * | 2/2012 | |
| JP | 6932648 | B2 | * | 9/2021 | E02F 9/265 |
| KR | 20230044253 | A | * | 4/2023 | F02D 29/02 |
| KR | 20230136210 | A | | 9/2023 | |
| KR | 102874684 | B1 | * | 10/2025 | F02D 29/02 |
| WO | WO-9966244 | A2 | * | 12/1999 | F16L 1/09 |
| WO | WO-2017170243 | A1 | * | 10/2017 | E02F 9/24 |
| WO | WO-2019012649 | A1 | * | 1/2019 | G01C 15/06 |
| WO | WO-2019139102 | A1 | * | 7/2019 | B66C 23/94 |

OTHER PUBLICATIONS

English Translation of CN12057481 (Year: 2025).*
English Translation of CN113874315 (Year: 2024).*
English Translation of CA 3052060N113874315 (Year: 2022).*
English Translation of JP6932648 (Year: 2021).*
English Translation of WO2019139102 (Year: 2019).*
English Translation of WO201912649 (Year: 2019).*
English Translation of JP2012032199 (Year: 2012).*
English Translation of JP2003119832 (Year: 2003).*
English Translation of JP2003119818 (Year: 2003).*
English Translation of JP3178556 (Year: 2001).*
English Translation of JP2001159518 (Year: 2001).*

* cited by examiner

SYSTEM AND METHOD FOR DETERMINING POSITION OF A PIPELAYER BOOM

TECHNICAL FIELD

The present disclosure relates to work machines, such as pipelayers, having booms for performing load lifting and lowering operations. More particularly, the present disclosure relates to a system and a method for determining an angular position of a boom of a pipelayer.

BACKGROUND

Work machines, such as pipelayers, are equipped with a boom for lifting and lowering loads during operations, such as a pipelaying operation. The boom is pivotally coupled to a side of the pipelayer and extends outward therefrom in a direction generally perpendicular to a forward travel direction of the pipelayer. During operations, the boom may be maneuvered (e.g., pivoted) to move over a range of positions (e.g., angular positions) with respect to the pipelayer. Accurately determining the position of the boom is crucial for the safe and efficient performance of the pipelayer.

Korean Patent Publication No. 20230136210 discloses a position estimation system, a first work machine, and an extension arm. The position estimation system includes a bucket angle sensor and a controller. The first work machine includes an arm, a bucket, and a bucket cylinder that drives the bucket, and is capable of swinging with respect to the vehicle body. The extension arm includes a link mechanism that transmits the drive of the bucket cylinder to the bucket, and can be mounted between the arm and the bucket. The bucket angle sensor can be placed on link mechanism. The controller includes shape data of the first work machine, shape data of the extension arm, information about the posture of the first work machine, and a value detected by the bucket angle sensor. Based on this, the position of the blade tip of the bucket is estimated.

SUMMARY OF THE INVENTION

In one aspect, the disclosure relates to a system for determining an angular position of a boom of a pipelayer. The system includes a linkage, an angle sensor, and a controller. The linkage includes a first arm configured to be coupled to a frame of the pipelayer, a second arm configured to be coupled to the boom, and a pivot joint pivotally connecting the first arm to the second arm. The angle sensor is positioned at the pivot joint. The angle sensor is configured to detect a pivot angle between the first arm and the second arm. The controller is configured to determine, based on the pivot angle, the angular position of the boom relative to the frame of the pipelayer.

In another aspect, the disclosure relates to a pipelayer. The pipelayer includes a frame, a boom pivotally coupled to the frame at a pin joint, and a system for determining an angular position of the boom relative to the frame. The system includes a linkage, an angle sensor, and a controller. The linkage includes a first arm configured to be coupled to the frame, a second arm configured to be coupled to the boom, and a pivot joint pivotally connecting the first arm to the second arm. The angle sensor is positioned at the pivot joint. The angle sensor is configured to detect a pivot angle between the first arm and the second arm. The controller is configured to determine, based on the pivot angle, the angular position of the boom relative to the frame of the pipelayer.

In yet another aspect, the disclosure relates to a method for determining an angular position of a boom of a pipelayer using a linkage including a first arm coupled to a frame of the pipelayer, a second arm coupled to the boom, and a pivot joint pivotally connecting the first arm with the second arm. The method includes detecting, via an angle sensor positioned at the pivot joint, a pivot angle between the first arm and the second arm. Further, the method includes determining, based on the pivot angle, the angular position of the boom relative to the frame of the pipelayer.

DETAILED DESCRIPTION

The present disclosure provides a system for determining an angular position of an implement (i.e., boom) of a machine, such as a pipelayer. The system provides a linkage and an angle sensor positioned at the linkage in a manner to facilitate precise and accurate measurement of the angular position of the boom of the pipelayer. The linkage may be optimized for accuracy, manufacturing, and serviceability of the angle sensor, without compromising the performance of structural joints (e.g., a pin joint connecting the boom with the machine) of the pipelayer (or the machine). Also, the linkage may be optimized to amplify the precision of the measurements from the angle sensor. Further, mounting the angle sensor onto the linkage located in an area of the machine (i.e., pipelayer) away from debris may keep the angle sensor safe from damage. Furthermore, the system enables convenient, cost effective, and durable power/data connections between the angle sensor (mounted to the linkage) and the machine systems, such as a controller.

Reference will now be made in detail to specific embodiments or features, examples of which are illustrated in the accompanying drawings. Generally, corresponding reference numbers may be used throughout the drawings to refer to the same or corresponding parts, e.g., 1, 1, 1", 101 and 201 could refer to one or more comparable components used in the same and/or different depicted embodiments.

Figure 1:
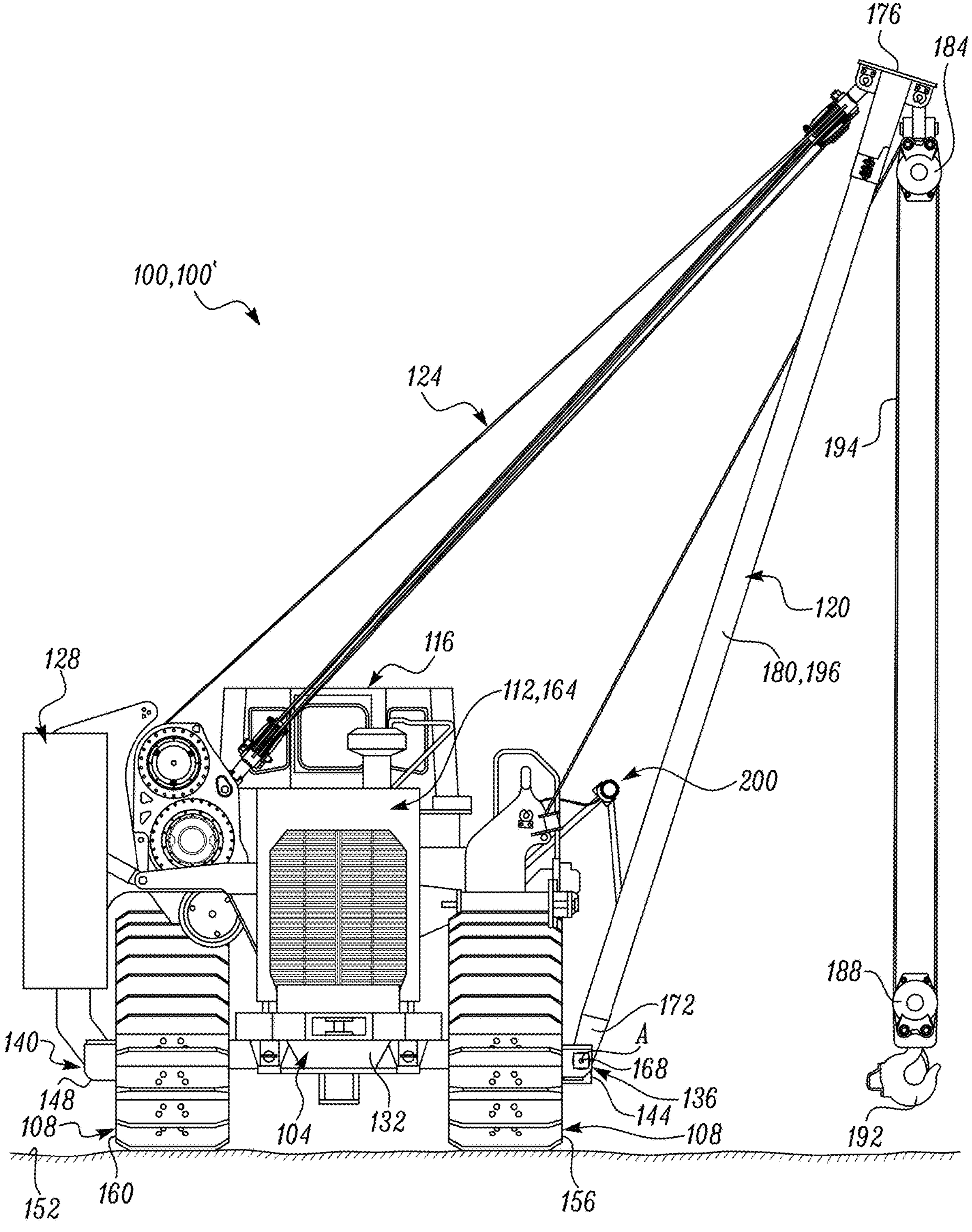
FIG. 1 is a front view of an exemplary pipelayer having frame and a boom pivotally coupled to the frame, in accordance with an embodiment of the present disclosure.

Referring to FIG. 1, an exemplary machine 100 is shown. In the illustrated embodiment, the machine 100 is embodied as a pipelayer 100' used to perform pipelaying operations. The pipelaying operations may include but not limited to lifting and/or lowering of a load, such as a conduit segment, a pipe segment, a culvert segment, a drainage segment, and the like, and installing the load at an installation site, such as a trench. In an exemplary pipelaying operation, a pipe segment (to be installed in a trench) is lifted-off of a work surface 152 (e.g., ground) by the pipelayer 100', placed over top of the trench, and lowered into the trench by the pipelayer 100.

Although references to the pipelayer 100' are used, aspects of the present disclosure may also be applicable to other work machines equipped with booms for suspending loads, such as dragline excavators, rope shovels, cranes, etc., and references to the pipelayer 100' in the present disclosure is to be viewed as purely exemplary.

The pipelayer 100' (or the machine 100) includes a frame 104, traction devices 108, a propulsion system 112, an operator cabin 116, a boom 120, a boom hoisting assembly 124, and a counterweight assembly 128. The frame 104 supports one or more components/assemblies of the pipelayer 100', such as the propulsion system 112, the operator cabin 116, the boom 120, the boom hoisting assembly 124, and the counterweight assembly 128, although other known components and structures may be supported by the frame 104, as well. The frame 104 may define a forward end 132 and a rearward end (not shown) opposite to the forward end 132. The forward end 132 and the rearward end may be defined in relation to an exemplary direction of travel of the pipelayer 100', with said direction of travel being defined from the rearward end towards the forward end 132.

Also, the frame 104 may define two lateral sides, namely, a first lateral side 136 and a second lateral side 140 opposite to the first lateral side 136. The two lateral sides 136, 140 may be located transversely relative to the exemplary direction of travel of the pipelayer 100'. In addition, the frame 104 may include a first track roller frame 144 and a second track roller frame 148. The first track roller frame 144 may be disposed at the first lateral side 136 of the pipelayer 100' and, the second track roller frame 148 may be disposed at the second lateral side 140 of the pipelayer 100.

The traction devices 108 may support the frame 104 (and thus the overall pipelayer 100') over the work surface 152 and may be powered by the propulsion system 112 to facilitate movement of the pipelayer 100' over an expanse of the installation site. The traction devices 108 may include tracks, or wheels, or a combination thereof. As shown in FIG. 1, the pipelayer 100 includes two traction devices 108, namely, a first track 156 and a second track 160. The first track 156 may be coupled to the first track roller frame 144 and, the second track 160 may be coupled to the second track roller frame 148. In other embodiments, it may be contemplated that higher or lesser number of tracks may be used in the pipelayer 100'.

The propulsion system 112 may include a power compartment 164 and a power source (not shown) provided within the power compartment 164. The power source may include a combustion engine, or an electrical power source, or a combination thereof. The power source may be configured to generate an output power required to operate various systems or assemblies on the pipelayer 100', with one operation exemplarily involving a pivoting of the boom 120 with respect to the frame 104 to lift or lower loads.

The operator cabin 116 may be supported over the frame 104. The operator cabin 116 may facilitate stationing of one or more operators therein, to monitor and control the operations of the pipelayer 100. Also, the operator cabin 116 may house various components and controls of the pipelayer 100', access to one or more of which may help the operators to perform the pipelaying operations. For example, the various components and controls of the pipelayer 100' may include, but not limited to, joysticks, switches, and the likes, to facilitate an operator in performing the pipelaying operations.

The boom 120 may be disposed on the first lateral side 136 of the frame 104. The boom 120 is pivotally coupled to the frame 104 at a pin joint 168 (located at the first lateral side 136 of the frame 104). It should be noted that the pin joint 168 may refer to any type of joint that facilitates pivoting movement of the boom 120 with respect to the frame 104. Examples of the pin joint 168 may include, but not limited to, a hinge joint, a ball and socket joint, a cylindrical joint, or any other type of articulated joint known in the art.

In an example, as shown in FIG. 1, the boom 120 defines a proximal end 172 pivotally coupled to the first track roller frame 144 (of the frame 104) at the pin joint 168, and a distal end 176 opposite to the proximal end 172 and away from the frame 104. The boom 120 may include one or more legs 180, a first hook block 184 pivotally coupled to the legs 180 at the distal end 176, a second hook block 188 operably coupled to the first hook block 184 (e.g., via at least one hook cable 194, and a lifting hook 192 coupled to the second hook block 188 and configured to suspend the load, such as a pipe section, to be lifted (or lowered).

Figure 2:
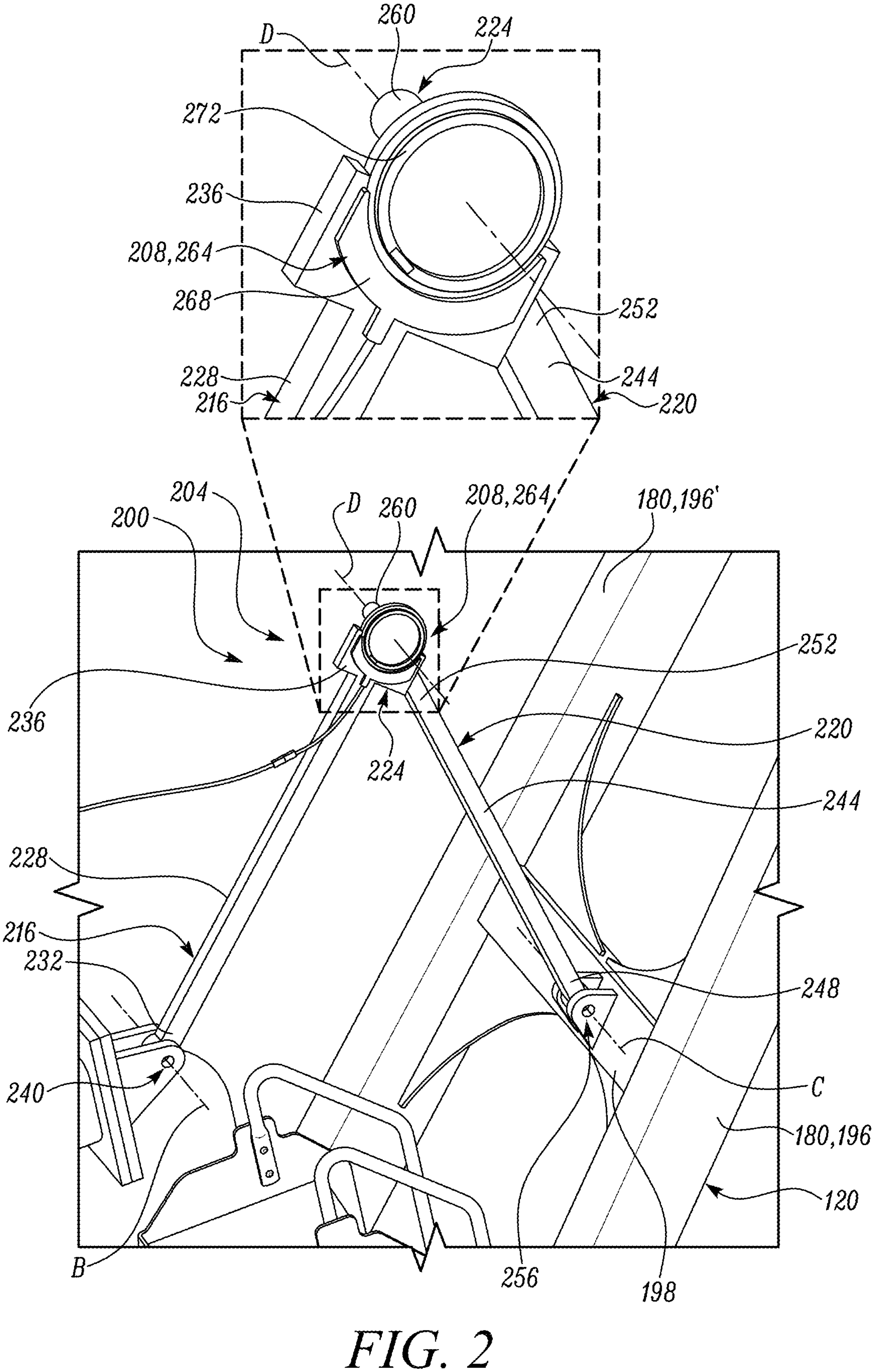
FIG. 2 is a perspective view of a system for determining an angular position of the boom relative to the frame, in accordance with an embodiment of the present disclosure.

In an exemplary embodiment, as shown in FIGS. 1 and 2, the boom 120 includes two legs 180, namely—a first leg 196 and a second leg 196'. Each of the first and second legs 196, 196' extends between the proximal end 172 and the distal end 176 of the boom 120. Also, each of the first and second legs 196, 196' is pivotally coupled to the first track roller frame 144 at the proximal end 172 of the boom 120 (via the pin joint 168). Further, the first leg 196 and the second leg 196 are coupled to one another, via a crossbeam 198 extending between the first leg 196 and the second leg 196'. In this illustrated configuration, the two leg 196, 196' impart a substantially elongated and triangular configuration to the boom 120. In other embodiments, the boom 120 may include single or multiple legs, based on application requirements.

The boom 120 is configured to pivot (or rotate) about a pin axis ‘A’ (shown in FIG. 3) (defined by the pin joint 168) relative to the frame 104. The boom 120 may pivot about the pin axis ‘A’ to move over a range of positions (e.g., angular positions) with respect to the frame 104, for example, to lift and lower a load (e.g., pipe segment) with respect to the work surface 152. In an example, the boom 120 may be pivotable between a raised position and a lowered position with respect to the frame 104. The raised position of the boom 120 may be a substantially vertical or stowed position of the boom 120 that may facilitate tramming of the pipelayer 100' across the site, whereas the lowered position of the boom 120 may be a substantially horizontal position of the boom 120 that may facilitate reach in order to suspend the load over a trench.

Figure 3:
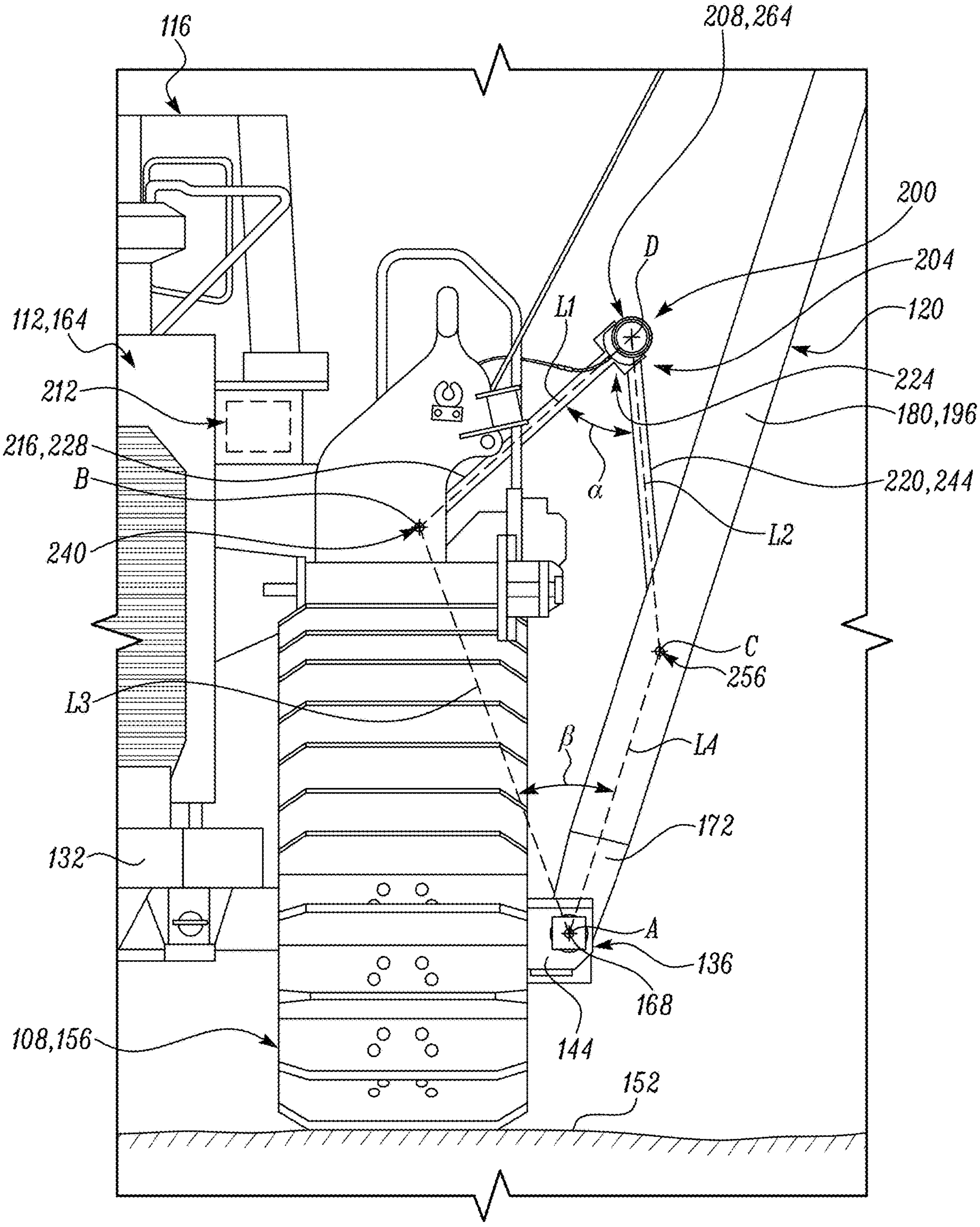
FIG. 3 is a front view of the system in operation, in accordance with an embodiment of the present disclosure.

Referring to FIGS. 2 and 3, the system 200 for determining the angular position of the boom 120 is discussed. The system 200 includes a linkage 204, an angle sensor 208, and a controller 212. Each of the linkage 204, the angle sensor 208, and the controller 212 is discussed in detail below.

The linkage 204 includes a first arm 216, a second arm 220, and a pivot joint 224. The first arm 216 may include an elongated strut 228 with any suitable cross-sectional shape, as viewed when the first arm 216 is dissected by a plane perpendicular to the elongation of the first arm 216. For example, the first arm 216 may have a closed cross-sectional shape, such as a circular cross-sectional shape, a square cross-sectional shape, an oval or elliptical cross-sectional shape, a hexagonal cross-sectional shape, or any irregular cross-sectional shape. In another example, the first arm 216 may have an open cross-sectional shape, to define one or more of a C-channel, I-beam, or an angular shape. In an embodiment, the first arm 216 may be a linear arm defining a linear longitudinal axis. In some embodiments, the first arm 216 may be an arcuate arm defining an arcuate longitudinal axis. Further, the first arm 216 may be made of rigid materials such as, cast iron, steel, or any other suitable material.

The first arm 216 defines a first end portion 232 and a second end portion 236 spaced apart from the first end portion 232 along the linear longitudinal axis of the first arm 216. The first arm 216 is configured to be coupled to the frame 104. In an example, as shown in FIG. 2, the first end portion 232 (of the first arm 216) is pivotally coupled with the frame 104 at a first pivot point 240. The first pivot point 240 may be located at the first lateral side 136 of the frame 104. The first pivot point 240 may define a first axis of rotation 'B' about which the first arm 216 rotates relative to the frame 104.

The second arm 220 may include an elongated strut 244 with any suitable cross-sectional shape, as viewed when the second arm 220 is dissected by a plane perpendicular to the elongation of the second arm 220. For example, the second arm 220 may have a closed cross-sectional shape, such as a circular cross-sectional shape, a square cross-sectional shape, an oval or elliptical cross-sectional shape, a hexagonal cross-sectional shape, or any irregular cross-sectional shape. In another example, the second arm 220 may have an open cross-sectional shape, to define one or more of a C-channel, I-beam, or an angular shape. In an embodiment, the second arm 220 may be a linear arm defining a linear longitudinal axis. In some embodiments, the second arm 220 may be an arcuate arm defining an arcuate longitudinal axis. Further, the second arm 220 may be made of rigid materials such as, cast iron, steel, or any other suitable material.

The second arm 220 defines a third end portion 248 and a fourth end portion 252 spaced apart from the third end portion 248 along the linear longitudinal axis of the second arm 220. The second arm 220 is configured to be coupled to the boom 120. In an example, as shown in FIG. 2, the third end portion 248 (of the second arm 220) is pivotally coupled with the boom 120 at a second pivot point 256. As shown in FIG. 2. the second pivot point 256 is located at the cross-beam 198 of the boom 120. In other embodiments, the second pivot point 256 may be located at any suitable location of the boom 120. Further, the second pivot point 256 may define a second axis of rotation 'C' about which the second arm 220 rotates relative to the boom 120. The second axis of rotation 'C' may be parallel to the first axis of rotation 'B'.

The pivot joint 224 pivotally connects the first arm 216 to the second arm 220. In an exemplary embodiment, as shown in FIG. 2, the pivot joint 224 includes a pin member 260 that passes through holes (not shown) defined on the second end portion 236 (of the first arm 216) and the fourth end portion 252 (of the second arm 220) to pivotally connect the first arm 216 and the second arm 220 together. The pivot joint 224 defines a pivot axis 'D' about which the first arm 216 and the second arm 220 rotate relative to one another, as the boom 120 pivots about the pin axis 'A' relative to the frame 104. The pivot axis 'D' is parallel to the pin axis 'A'. In addition, the pivot axis 'D' is parallel to each of the first axis of rotation 'B' and the second axis of rotation 'C'.

The linkage 204 is coupled between the frame 104 and the boom 120 in a manner such that the pivot joint 224 is at a first elevation with respect to the work surface 152, the pin joint 168 is at a second elevation with respect to the work surface 152, the first pivot point 240 is at a third elevation with respect to the work surface 152, and the second pivot point 256 is at a fourth elevation with respect to the work surface 152. The first elevation is greater than each of the second elevation, the third elevation, and the fourth elevation. In addition, the second elevation is lower than each of the third elevation and the fourth elevation. Further, in some embodiments, the first elevation may be lower than at least one of the third elevation and the fourth elevation.

The angle sensor 208 may include a rotary sensor 264. The rotary sensor 264 may include a stator element 268 and a rotor element 272 configured to rotate with respect to the stator element 268 about the pivot axis 'D'. The angle sensor 208 is positioned at the pivot joint 224. For instance, the stator element 268 may be coupled to one of the first arm 216 or the second arm 220 and the rotor element 272 may be coupled to the other of the first arm 216 or the second arm 220. In an exemplary embodiment, as shown in FIG. 2, the stator element 268 is coupled to the second end portion 236 of the first arm 216 and the rotor element 272 is coupled to the fourth end portion 252 of the second arm 220. The angle sensor 208 is configured to detect a pivot angle 'α' between the first arm 216 and the second arm 220. For instance, the angle sensor 208 (i.e., the rotary sensor 264) may detect the pivot angle 'α' between the first arm 216 and the second arm 220 based on rotation of the rotor element 272 about the pivot axis 'D' with respect to the stator element 268. Further, the angle sensor 208 generates a signal indicative of the pivot angle 'α' between the first arm 216 and the second arm 220.

In some embodiments, the angle sensor 208 may be a magnetic sensor for sensing the pivot angle 'α' by detecting a change in a magnetic field due to relative rotation between the first arm 216 and the second arm 220. Although the angle sensor 208 is described as the rotary sensor 264 or the magnetic sensor, it should be noted that the angle sensor 208 is not limited to the above two types of sensors, and that the angle sensor 208 refers to any device capable of detecting the pivot angle 'α' between the first arm 216 and the second arm 220 of the linkage 204.

The controller 212 is now discussed. The controller 212 is communicably coupled to the angle sensor 208. The controller 212 is configured to receive the signal indicative of the pivot angle 'α' between the first arm 216 and the second arm 220 (of the linkage 204) from the angle sensor 208. Based on the signal (i.e., the pivot angle 'α'), the controller 212 is configured to determine the angular position of the boom 120 relative to the frame 104. To this end, the controller 212 is configured to obtain a first parameter indicative of a length (shown in a dashed line 'L1') of the first arm 216, a second parameter indicative of a length (shown in a dashed line 'L2') of the second arm 220, a third parameter indicative of a linear distance (shown in a dashed line 'L3') between the pin joint 168 and the first pivot point 240, and a fourth parameter indicative of a linear distance (shown in a dashed line 'L4') between the pin joint 168 and the second pivot point 256. The controller 212 may obtain the first parameter (i.e., the length 'L1'), the second parameter (i.e., the length 'L2'), the third parameter (i.e., the linear distance 'L3'), and the fourth parameter (i.e., the linear distance 'L4') from one or more datasets stored in a memory associated with the controller 212.

Based on the pivot angle 'α' (received from the signal), the first parameter (i.e., the length 'L1'), the second parameter (i.e., the length 'L2'), the third parameter (i.e., the linear distance 'L3'), and the fourth parameter (i.e., the linear distance 'L4'), the controller 212 calculates a boom angle 'β' (shown in FIG. 3) between the linear distances 'L3' and 'L4'. The boom angle 'β' indicates the angular position of the boom 120 relative to the frame 104 of the pipelayer 100. In an exemplary embodiment, the controller 212 may calculate the boom angle 'β' using the law of cosines. In another embodiment, the controller 212 may calculate the boom angle 'β' using the law of sines. In yet another embodiment, the controller 212 may calculate the boom angle 'β' using any suitable equations known in the art.

Exemplarily, the controller 212 may be a microprocessor-based device, and/or may be envisioned as an application-specific integrated circuit, or other logic devices, which provide controller functionality, with such devices being known to those with ordinary skill in the art. In one example, it is possible for the controller 212 to include or be representative of one or more controllers having separate or integrally configured processing units to process a variety of data (or signal). Further, the controller 212 may be optimally suited for accommodation within certain machine panels or portions from where the controller 212 may remain accessible for ease of use, service, calibration, and repairs. The controller 212 may be hard-wired to the angle sensor 208, and to various other components and devices, associated with the machine 100. Further, in some embodiments, the controller 212 may be integrated with a machine controller and/or may be one and the same as the machine controller. Moreover, certain discussions applicable to the controller 212 may be suitably applicable to the machine controller, as may be contemplated by someone skilled in the art based on the present disclosure.

Processing units, to process the signals/data from the angle sensor 208, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory may include a hard disk drive (HDD), and a secure digital (SD) card. Further, the memory may include non-volatile/volatile memory units such as a random-access memory (RAM)/a read only memory (ROM), which include associated input and output buses. The memory may be configured to store the datasets, such as the first parameter, the second parameters, etc., that may be executable by the controller 212 to execute a method for determining the angular position of the boom 120 with respect to the frame 104, as has been discussed in the present disclosure.

INDUSTRIAL APPLICABILITY

During the pipelaying operation, the boom 120 may be pivoted about the pin axis 'A' with respect to the frame 104 in a manner to move the distal end 176 of the boom 120, and hence the load suspended from the lifting hook 192 operably coupled to the distal end 176, towards or away from the frame 104. It should be noted that a maximum allowable load capacity and stability of the machine 100, such as the pipelayer 100', may depend on the orientation (i.e., the angular position) of the boom 120 with respect to the frame 104. For example, the maximum allowable load capacity (and the stability) of the pipelayer 100' may decrease as the distal end 176 of the boom 120, with the load suspended therefrom, moves away from the first lateral side 136 of the frame 104.

To ensure safe and efficient operation of the machine 100 (the pipelayer 100'), the angular position of the boom 120 with respect to the frame 104 is to be determined. In this regard, the present disclosure provides the system 200, e.g., the linkage 204 including the first arm 216 coupled to the first lateral side 136 of the frame 104, the second arm 220 coupled to the boom 120, and the pivot joint 224 pivotally connecting the first arm 216 with the second arm 220; the angle sensor 208 positioned at the pivot joint 224; and the controller 212.

Figure 4:
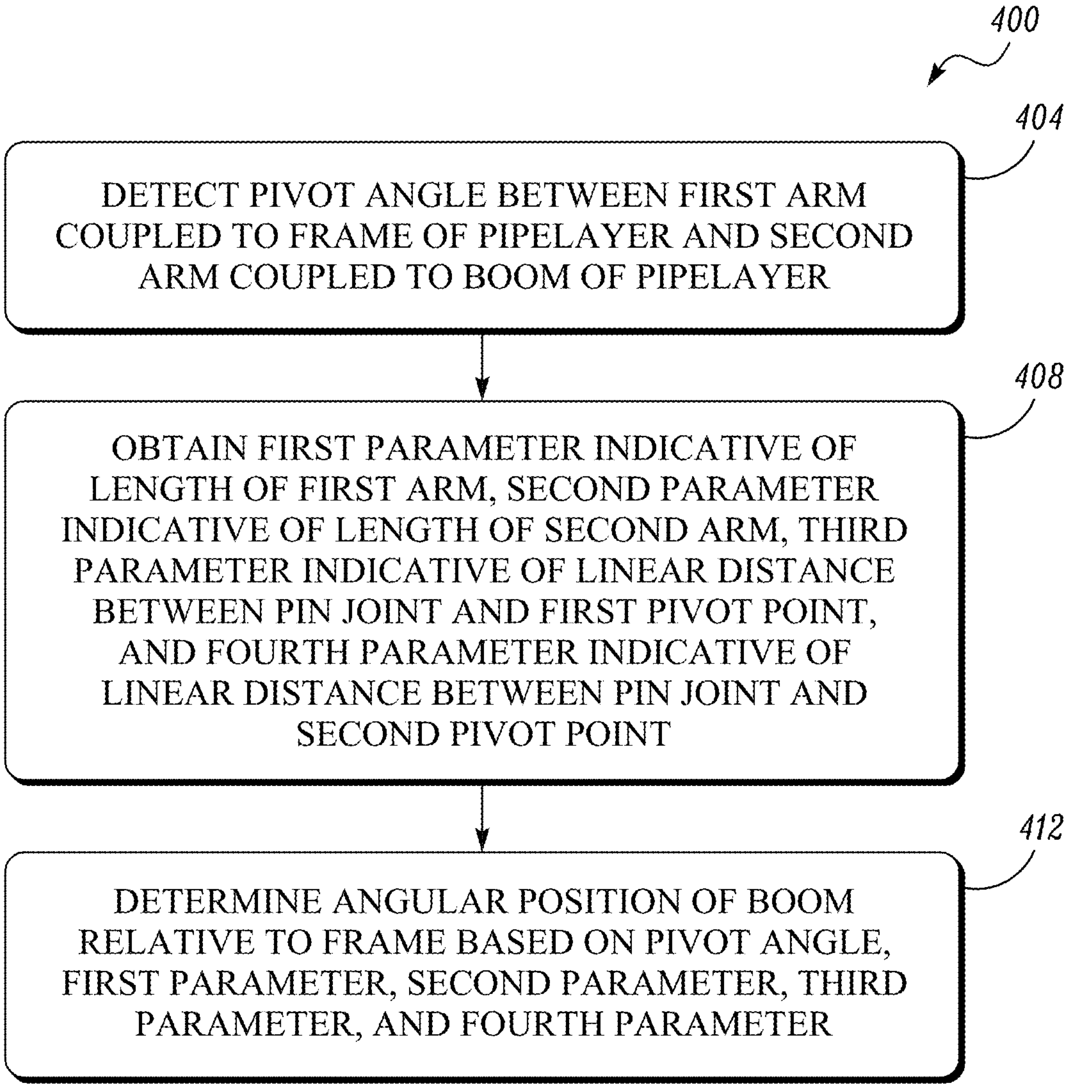
FIG. 4 is a flowchart illustrating a method for determining the angular position of the boom, in accordance with an embodiment of the present disclosure.

Referring to FIG. 4, an example method for determining the angular position of the boom 120 with respect to the frame 104, using the system 200, is now discussed. The method is discussed by way of a flowchart 400 that illustrates example steps (i.e., from 404 to 412) associated with the method. The example method is also discussed in conjunction with FIGS. 1-3.

Pivoting of the boom 120 with respect to the frame 104 about the pin axis 'A', for example, to install the load (e.g., a culvert segment) in a trench, causes the first arm 216 (pivotally coupled to the frame 104 at the first pivot point 240) and the second arm 220 (pivotally coupled to the boom 120 at the second pivot point 256) to correspondingly pivot with respect to one another about the pivot axis 'D' at the pivot joint 224. Accordingly, the angle sensor 208 (positioned at the pivot joint 224) detects the pivot angle 'α' between the first arm 216 and the second arm 220, at step 404. In addition, the angle sensor 208 may generate a signal based on the pivot angle 'α' detected and transmit the signal to the controller 212.

The controller 212 may receive the signal indicative of the pivot angle 'α' detected, from the angle sensor 208. In addition, the controller 212 may obtain the first parameter indicative of the length 'L1' of the first arm 216, the second parameter indicative of the length 'L2' of the second arm 220, the third parameter indicative of the linear distance 'L3' between the pin joint 168 and the first pivot point 240, and the fourth parameter indicative of the linear distance 'L4' between the pin joint 168 and the second pivot point 256, at step 408.

Based on the value of the pivot angle 'α' (received from the angle sensor 208), the first parameter (i.e., the length 'L1'), the second parameter (i.e., the length 'L2'), the third parameter (i.e., the linear distance 'L3'), and the fourth parameter (i.e., the linear distance 'L4'), the controller 212 determines the boom angle 'β' indicative of the angular position of the boom 120 relative to the frame 104 of the pipelayer 100', at step 412. In one example, the controller 212 may calculate the boom angle 'β' using the law of cosines. In another example, the controller 212 may calculate the boom angle 'β' using the law of sines. In yet another example, the controller 212 may calculate the boom angle 'β' using any suitable equations known in the art.

The system 200 may be retrofitted on any machine equipped with a boom, such as pipelayers, dragline excavators, rope shovels, cranes, etc., with little or no modification to existing systems, in turn, improving flexibility and compatibility. Positioning the angle sensor 208 at the pivot joint 224 of the linkage 204 may prevent the angle sensor 208 from directly contacting dirt, debris, or other foreign material present on work surface (e.g., installation site). Further, positioning the angle sensor 208 at the first elevation greater than the second elevation, at which the boom 120 is pivotally coupled to the frame 104 via the pin joint 168, may provide mechanical advantage facilitating accurate and precise detection of the boom angle 'β' corresponding to fine changes in the angular position of the boom 120 with respect to the frame 104. Further, positioning the angle sensor 208 away from the pin joint 168 (pivotally connecting the boom 120 with the frame 104), and not at the pin joint 168, eliminates the possibility of damaging and/or misalignment of the angle sensor 208, for example, during the assembly or disassembly of the boom 120 with the frame 104 of the machine 100 (the pipelayer 100'). In addition, a hard-wired connection (as shown in FIG. 3) between the angle sensor 208 and other electronic/electrical devices (e.g., the controller 212) may be established for fast, reliable, and inexpensive transfer of information (signals) between the angle sensor 208 and the electronic/electrical devices.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system, the pipelayer, and/or the method, of the present disclosure without departing from the scope of the disclosure. Other embodiments will be apparent to those skilled in the art from consideration of the specification and practice of the system, the pipelayer, and/or the method disclosed herein. It is intended that the specification and examples be considered as exemplary only, with a true scope of the disclosure being indicated by the following claims and their equivalent.

What is claimed is:

1. A system, comprising:

a linkage, comprising:

a first arm directly coupled to a frame, of a pipelayer, supporting a boom of the pipelayer, a second arm directly coupled to a leg of the boom, and a pivot joint pivotally connecting the first arm to the second arm;

an angle sensor, at the pivot joint, configured to detect a pivot angle between the first arm and the second arm; and a controller configured to determine, based on the pivot angle, an angular position of the boom relative to the frame of the pipelayer.

2. The system of claim 1, wherein the first arm is coupled to the frame at a first pivot point defining a first axis of rotation about which the first arm is configured to rotate relative to the frame, and the second arm is coupled to the boom at a second pivot point defining a second axis of rotation about which the second arm is configured to rotate relative to the boom, wherein the pivot joint defines a pivot axis about which the first arm and the second arm rotate relative to one another, wherein the first axis of rotation, the second axis of rotation, and the pivot axis are parallel to one another.

3. The system of claim 2, wherein the boom is pivotally coupled to the frame at a pin joint defining a pin axis about which the boom is configured to rotate relative to the frame, and wherein the pin axis is parallel to the pivot axis.

4. The system of claim 3, wherein the first pivot point and the pin joint are located at a first lateral side of the frame.

5. The system of claim 4, wherein the pivot joint is at a first elevation with respect to a work surface, the pin joint is at a second elevation with respect to the work surface, and wherein the first elevation is greater than the second elevation.

6. The system of claim 5, wherein the first pivot point is at a third elevation with respect to the work surface and the second pivot point is at a fourth elevation with respect to the work surface, wherein the first elevation is greater than each of the third elevation and the fourth elevation.

7. The system of claim 1, wherein the first arm is coupled to the frame at a first pivot point, the second arm is coupled to the boom at a second pivot point, and the boom is pivotally coupled to the frame at a pin joint, and wherein, to determine the angular position of the boom, the controller is configured to:

obtain a first parameter indicative of a length of the first arm, a second parameter indicative of a length of the second arm, a third parameter indicative of a linear distance between the pin joint and the first pivot point, and a fourth parameter indicative of a linear distance between the pin joint and the second pivot point; and determine a boom angle indicative of the angular position of the boom relative to the frame based on the pivot angle, the first parameter, the second parameter, the third parameter, and the fourth parameter.

8. The system of claim 1, wherein the pivot joint defines a pivot axis about which the first arm and the second arm are configured to rotate relative to one another, wherein the angle sensor is a rotary sensor including a stator element coupled to one of the first arm or the second arm and a rotor element coupled to the other of the first arm or the second arm, and wherein the rotary sensor is configured to detect the pivot angle between the first arm and the second arm based on rotation of the rotor element about the pivot axis with respect to the stator element.

9. The system of claim 1, wherein the angle sensor is a magnetic sensor.

10. A pipelayer, comprising:

a frame supporting a boom pivotally coupled to the frame at a pin joint; and a system, including:

a linkage, comprising:

a first arm directly coupled to the frame, a second arm coupled to the boom, and a pivot joint pivotally connecting the first arm to the second arm;

an angle sensor, at the pivot joint, configured to detect a pivot angle between the first arm and the second arm; and a controller configured to determine, based on the pivot angle, an angular position of the boom relative to the frame of the pipelayer.

11. The pipelayer of claim 10, wherein the first arm is coupled to the frame at a first pivot point defining a first axis of rotation about which the first arm is configured to rotate relative to the frame, and the second arm is coupled to the boom at a second pivot point defining a second axis of rotation about which the second arm is configured to rotate relative to the boom, wherein the pivot joint defines a pivot axis about which the first arm and the second arm rotate relative to one another, wherein the first axis of rotation, the second axis of rotation, and the pivot axis are parallel to one another.

12. The pipelayer of claim 11, wherein the pin joint defines a pin axis about which the boom is configured to rotate relative to the frame, and wherein the pin axis is parallel to the pivot axis.

13. The pipelayer of claim 12, wherein the first pivot point and the pin joint are located at a first lateral side of the frame.

14. The pipelayer of claim 13, wherein the pivot joint is at a first elevation with respect to a work surface, the pin joint is at a second elevation with respect to the work surface, the first pivot point is at a third elevation with respect to the work surface, and the second pivot point is at a fourth elevation with respect to the work surface, and wherein the first elevation is greater than each of the second elevation, the third elevation, and the fourth elevation.

15. The pipelayer of claim 10, wherein the first arm is coupled to the frame at a first pivot point and the second arm is coupled to the boom at a second pivot point, and wherein to determine the angular position of the boom, the controller is configured to:

obtain a first parameter indicative of a length of the first arm, a second parameter indicative of a length of the second arm, a third parameter indicative of a linear distance between the pin joint and the first pivot point, and a fourth parameter indicative of a linear distance between the pin joint and the second pivot point; and determine a boom angle indicative of the angular position of the boom relative to the frame based on the pivot angle, the first parameter, the second parameter, the third parameter, and the fourth parameter.

16. The pipelayer of claim 10, wherein the pivot joint defines a pivot axis about which the first arm and the second arm are configured to rotate relative to one another, wherein the angle sensor is a rotary sensor including a stator element coupled to one of the first arm or the second arm and a rotor element coupled to the other of the first arm or the second arm, and wherein the rotary sensor is configured to detect the pivot angle between the first arm and the second arm based on rotation of the rotor element about the pivot axis with respect to the stator element.

17. A method, comprising:

detecting, via an angle sensor positioned at a pivot joint pivotally connecting a first arm and a second arm of a linkage, a pivot angle between the first arm and the second arm, wherein the first arm is directly coupled to a frame of a pipelayer supporting a boom of the pipelayer, and the second arm is directly coupled to a second arm directly coupled to a leg of a boom; and determining, based on the pivot angle, an angular position of the boom relative to the frame of the pipelayer.

18. The method of claim 17, wherein the first arm is coupled to the frame at a first pivot point defining a first axis of rotation about which the first arm rotates relative to the frame, and the second arm is coupled to the boom at a second pivot point defining a second axis of rotation about which the second arm rotates relative to the boom, wherein the pivot joint defines a pivot axis about which the first arm and the second arm rotate relative to one another, and wherein the first axis of rotation, the second axis of rotation, and the pivot axis are parallel to one another.

19. The method of claim 18, wherein the boom is pivotally coupled to the frame at a pin joint defining a pin axis about which the boom is configured to rotate relative to the frame, wherein the pin axis is parallel to the pivot axis, wherein the first pivot point and the pin joint are located at a first lateral side of the frame, wherein the pivot joint is at a first elevation with respect to a work surface, the pin joint is at a second elevation with respect to the work surface, the first pivot point is at a third elevation with respect to the work surface, and the second pivot point is at a fourth elevation with respect to the work surface, and wherein the first elevation is greater than each of the second elevation, the third elevation, and the fourth elevation.

20. The method of claim 17, wherein the first arm is coupled to the frame at a first pivot point, the second arm is coupled to the boom at a second pivot point, and the boom is pivotally coupled to the frame at a pin joint, and wherein determining the angular position of the boom includes:

obtaining, via a controller, a first parameter indicative of a length of the first arm, a second parameter indicative of a length of the second arm, a third parameter indicative of a linear distance between the pin joint and the first pivot point, and a fourth parameter indicative of a linear distance between the pin joint and the second pivot point; and determining, by the controller, a boom angle indicative of the angular position of the boom relative to the frame of the pipelayer based on the pivot angle, the first parameter, the second parameter, the third parameter, and the fourth parameter.

* * * * *